United States Patent
Epperson et al.

(10) Patent No.: US 8,032,093 B1
(45) Date of Patent: Oct. 4, 2011

(54) POWER DETECTION ARRANGEMENT WITH HARMONIC SUPPRESSOR

(75) Inventors: Darrell G. Epperson, Oak Ridge, NC (US); Gary Lewis, High Point, NC (US); James P. Conlon, Charlotte, NC (US); Steven A. Brown, Summerfield, NC (US)

(73) Assignee: Triquint Semiconductor, Inc., Hillsboro, OR (US)

( * ) Notice: Subject to any disclaimer, the term of this patent is extended or adjusted under 35 U.S.C. 154(b) by 713 days.

(21) Appl. No.: 12/128,521

(22) Filed: May 28, 2008

(51) Int. Cl.
*H04B 1/04* (2006.01)
*H04K 3/00* (2006.01)

(52) U.S. Cl. ............ 455/114.1; 330/109; 333/167

(58) Field of Classification Search ......... 455/114.1; 330/109, 110; 333/167, 219
See application file for complete search history.

(56) References Cited

U.S. PATENT DOCUMENTS

| | | | |
|---|---|---|---|
| 4,905,270 A * | 2/1990 | Ono ................ | 455/569.2 |
| 5,884,149 A | 3/1999 | Jaakola | |
| 6,639,471 B2 | 10/2003 | Matsuura | |
| 6,759,922 B2 | 7/2004 | Adar | |
| 7,187,250 B2 | 3/2007 | Matters-Kammerer | |
| 7,319,850 B2 * | 1/2008 | Motoyama ............ | 455/307 |
| 2004/0227502 A1 * | 11/2004 | Wyse et al. ........... | 324/117 R |

FOREIGN PATENT DOCUMENTS

JP  2004-304435  * 10/2004

* cited by examiner

*Primary Examiner* — Lee Nguyen
(74) *Attorney, Agent, or Firm* — Schwabe Williamson & Wyatt

(57) ABSTRACT

Embodiments of circuits, devices, and methods for a power detection arrangement are disclosed. The power detection arrangement may have a coupler coupled with, and in between, a switch and an output to couple a signal to a detector. The power detection arrangement may include a harmonic suppressor coupled with, and in between, the coupler and the detector to reduce an amount of harmonic signals transmitted back to the coupler. Other embodiments may be described and claimed.

12 Claims, 5 Drawing Sheets

POWER DETECTION ARRANGEMENT WITH HARMONIC SUPPRESSOR

FIELD

Embodiments of the present disclosure relate generally to the field of circuits, and more particularly to a power detection arrangement with a harmonic suppressor.

BACKGROUND

A radio frequency (RF) transmit chain typically has a power amplifier to amplify a signal for transmission within a given frequency band. A power detector, placed after the power amplifier, samples a signal output from the power amplifier in order to determine an amplification provided by the power amplifier. This sample is used in a feedback loop that may result in an adjustment of the amplification of the power amplifier.

BRIEF DESCRIPTION OF THE DRAWINGS

Embodiments are illustrated by way of example and not by way of limitation in the figures of the accompanying drawings, in which like references indicate similar elements.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present disclosure; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

In providing some clarifying context to language that may be used in connection with various embodiments, the phrases "A/B" and "A and/or B" mean (A), (B), or (A and B); and the phrase "A, B, and/or C" means (A), (B), (C), (A and B), (A and C), (B and C), or (A, B and C).

The phrase "coupled with," along with its derivatives, may be used herein. "Coupled with" may mean either one or both of the following: a direct coupling or connection, where there is no other element coupled or connected between the elements that are said to be coupled with each other; or an indirect coupling or connection, where one or more other elements are coupled or connected between the elements that are said to be coupled with each other. In other words, "coupled with" may mean that two or more elements are in direct contact, e.g., physical or electrical contact, and/or "coupled with" may mean that two or more elements indirectly contact each other, but yet still cooperate or interact with each other.

Figure 1:
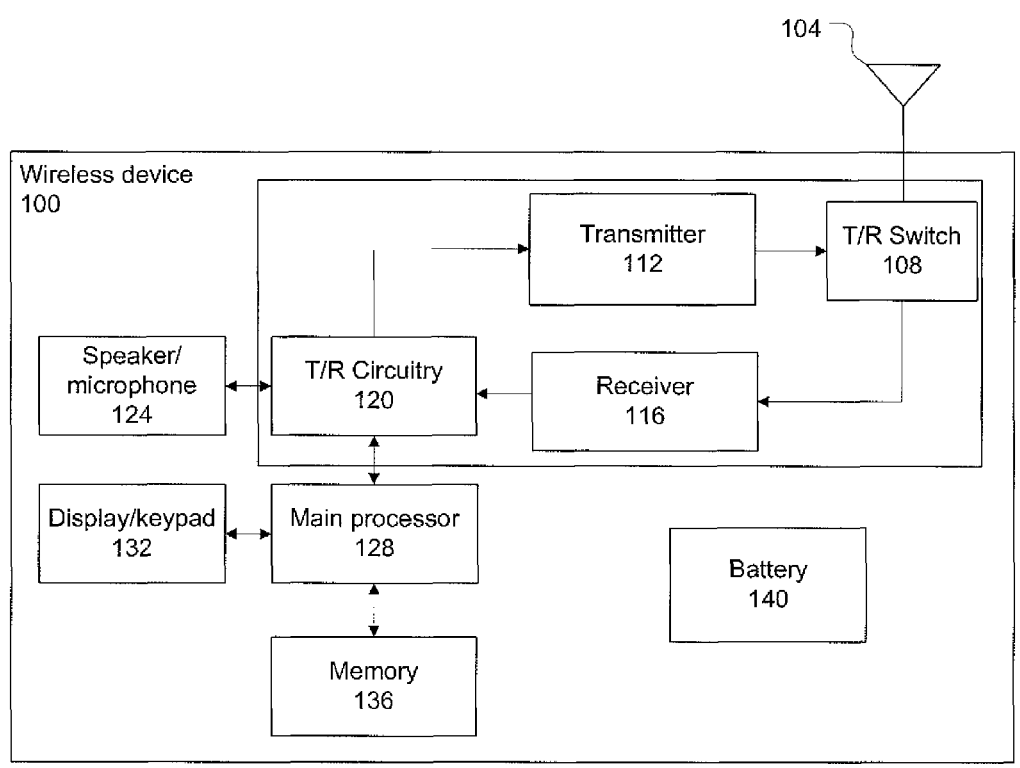
FIG. 1 illustrates a wireless device in accordance with various embodiments.

FIG. 1 illustrates a wireless device 100 in accordance with various embodiments. The wireless device 100 may have an antenna structure 104, a transmit/receive (T/R) switch 108, a transmitter 112, a receiver 116, transmit/receive (T/R) circuitry 120, a speaker/microphone 124, a main processor 128, a display/keypad 132, a memory 136, and a battery 140 coupled with each other at least as shown.

In various embodiments, the wireless device 100 may be a wireless communication device, e.g., a mobile telephone, a paging device, a personal digital assistant, a text-messaging device, a portable computer, a base station, or any other device capable of wireless communication, etc. In other embodiments, the wireless device 100 may be another type of device that may wirelessly transmit RF signals, e.g., a radar transmitter, etc.

In various embodiments, the wireless communication may be in accordance with any of a number of cellular communication protocols, e.g., a global system for mobile communications (GSM), universal mobile telecommunication system (UMTS), code division multiple access (CDMA), etc. In other embodiments, the wireless communication may be additionally/alternatively in accordance with computer network communication protocols, e.g., Worldwide Interoperability for Microwave Access (WiMax), High Performance Radio Metropolitan Area Network (HIPERMAN), etc.

The main processor 128 may execute a basic operating system program stored in the memory 136, in order to control the overall operation of the wireless device 100. For example, the main processor 128 may control the reception of signals and the transmission of signals by T/R circuitry 120, receiver 116, transmitter 112, and/or T/R switch 108. The main processor 128 may be capable of executing other processes and programs resident in the memory 136 and may move data into or out of memory 136, as desired by an executing process.

The T/R circuitry 120 may receive analog or digital voice data from the microphone or other outgoing data (e.g., web data, e-mail, etc.) from the main processor 128. The T/R circuitry 120 may transmit an RF signal to the transmitter 112. The transmitter 112 may amplify the RF signal for transmission. The amplified RF signal may be forwarded to the T/R switch 108 and then to the antenna structure 104 for an over-the-air (OTA) transmission to an intended recipient.

The transmitter 112 may be plural-band transmitter capable of amplifying an RF signal in a plurality of frequency bands. The transmitter 112 may have an RF transmit chain for each frequency band, with each RF transmit chain having an RF power amplifier for amplification of RF signals within the respective frequency band.

In a manner similar to the transmission path, the T/R circuitry 120 may receive an incoming OTA signal from the antenna structure 104 through the T/R switch 108 and receiver 116. The incoming signal may be from a communication system or a wireless network provider. The T/R circuitry 120 may process and send the incoming signal to the speaker (e.g., for voice data) or to the main processor 128 (e.g., for web browsing data) for further processing.

In various embodiments, the antenna structure 104 may include one or more directional and/or omnidirectional antennas, including, e.g., a dipole antenna, a monopole antenna, a patch antenna, a loop antenna, a microstrip antenna or any other type of antenna suitable for OTA transmission/reception of RF signals.

The main processor 128 may also be coupled with the display/keypad 132. A user of the wireless device 100 may use the keypad to enter data into the wireless device 100. The display may be a liquid crystal display capable of rendering text and/or graphics. Alternate embodiments may use other types of displays. The battery 140 may be coupled with the electrical components of the wireless device 100 in accordance with known electrical principles.

Those skilled in the art will recognize that the wireless device 100 is given by way of example and that for simplicity and clarity, only so much of the construction and operation of the wireless device 100 as is necessary for an understanding of the embodiments is shown and described. In addition, or as an alternative, although an exemplary wireless device 100 is shown and described, various embodiments contemplate any suitable component or combination of components performing any suitable tasks in association with wireless device 100, according to particular needs. Moreover, it is understood that the wireless device 100 should not be construed to limit the types of devices in which embodiments may be implemented.

In accordance with various embodiments, the T/R switch 108 may include an RF detection arrangement capable of detecting the power of an RF signal transmitted through any of the bands of the transmitter 112. Various embodiments of the T/R switch 108, its components, including the RF detection arrangement, and their operation are described in greater detail with respect to FIGS. 2-5.

Figure 2:
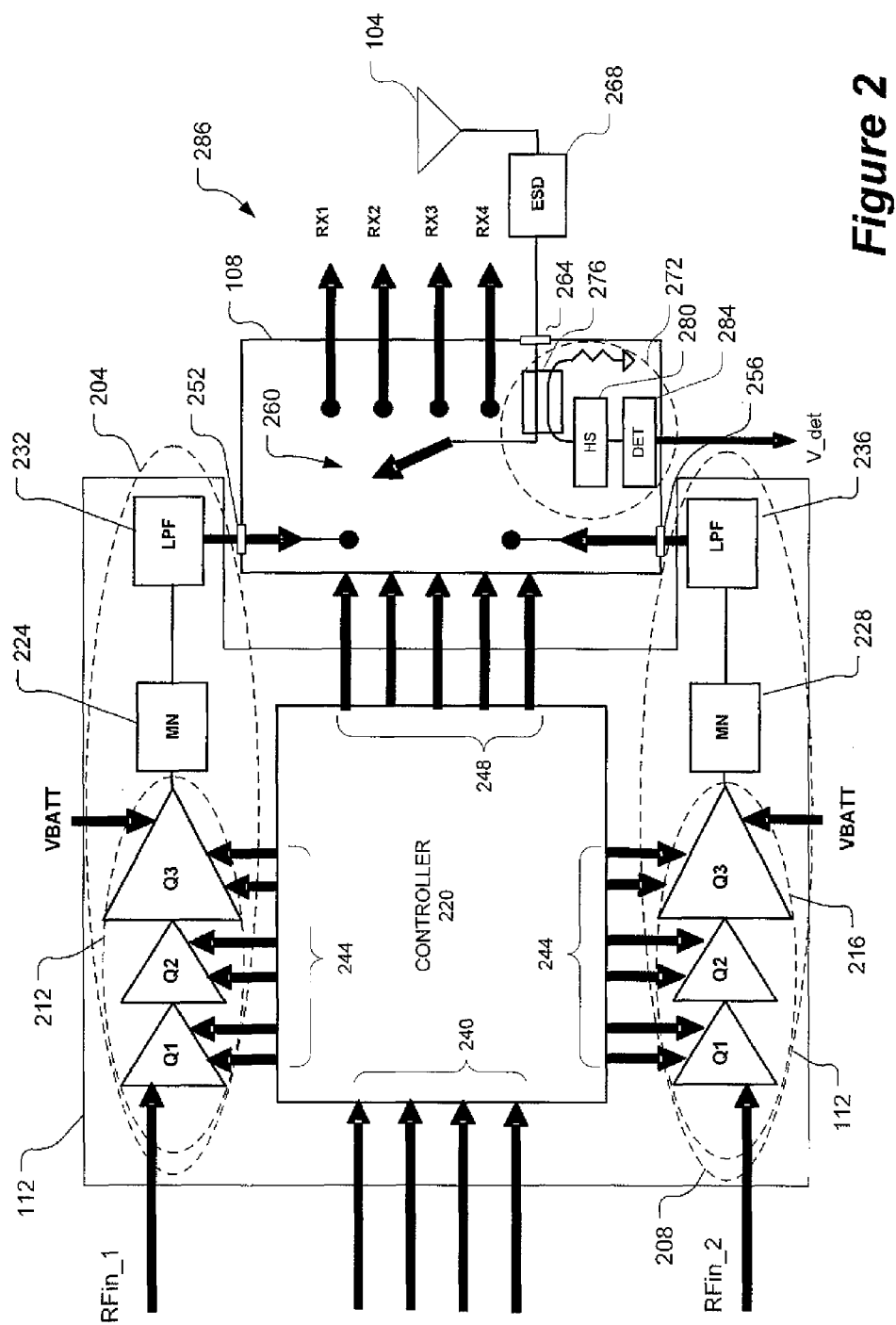
FIG. 2 illustrates components of the wireless device in additional detail in accordance with various embodiments.

FIG. 2 illustrates components of the wireless device 100 in additional detail in accordance with various embodiments. The illustrated components, which were previously introduced, include the transmitter 112, the T/R switch 108, and the antenna structure 104.

As illustrated, the transmitter 112 may include a first RF transmit chain 204 for amplifying RF signals in a first frequency band, and a second RF transmit chain 208 for amplifying RF signals in a second frequency band. The first and second frequency bands may be non-overlapping frequency bands.

The RF transmit chains 204 and 208 may include power amplifiers 212 and 216, respectively. The power amplifiers 212 and 216 may each receive a respective RF input signal, e.g., RFin_1 and RFin_2, from the T/R circuitry 120. This may occur at different points in time. The RF input signals may be amplified through multiple, sequential stages e.g., Q1, Q2, and Q3, of the power amplifiers. Each stage of the power amplifiers may receive control signals from a controller 220 that may relate to desired amplification, or gain, to be provided by the respective stage.

The output of the power amplifiers 212 and 216 may be coupled with matching networks (MNs) 224 and 228, respectively, which may be configured to match an output impedance of the power amplifiers. The MNs 224 and 228 may, in turn, be respectively coupled with low pass filters (LPFs) 232 and 236, as shown. The LPFs 232 and 236 may filter out any part of the signal that is outside of the desired frequency band.

The controller 220 may receive a number of input control signals 240, e.g., from the T/R circuitry 120 and/or from the main processor 128 directly. The input control signals 240 may relate to various operations of the transmitter 112, some of which may be described in more detail herein. The controller 220 may control a gain of each stage of the power amplifiers 212 and 216 through amplification control signals 244. The controller 220 may control the T/R switch 108 through switch control signals 248.

The T/R switch 108 may include a first input 252, configured to be coupled with the RF transmit chain 204, and a second input 256, configured to be coupled with the RF transmit chain 208. The T/R switch 108 may also have a switch 260 configured to selectively couple a selected one of the inputs 252 or 256 with an output 264, which may be coupled with the antenna structure 104 through an electrostatic discharge device (ESD) 268. The controller 220 may control the switch 260 to couple either the RF transmit chain 204 or the RF transmit chain 208 with the output 264 depending on whether the transmitter 112 is transmitting RFin_1 or RFin_2.

The T/R switch 108 may also include a detection arrangement 272 that has a coupler 276 coupled with, and disposed in between, the switch 260 and the output 264 as shown. The detection arrangement 272 may also include a harmonic suppressor (HS) 280 that is coupled with, and disposed in between, the coupler 276 and a detector 284.

The coupler 276 may transmit a derivative detection signal, which is derived from the RF signal being transmitted to the antenna structure 104, to the detector 284. In some embodiments, the derivative detection signal may be a sample of the RF signal being transmitted to the antenna structure 104. The derivative detection signal may be transmitted, substantially unchanged, through the harmonic suppressor 280 to the detector 284. The detector 284 may then output a detection voltage V_det that is based at least in part on the derivative detection signal. In this manner, the detector 284 may be used to detect the power of the RF signal.

When the derivative detection signal is provided to the detector 284 at a given frequency, harmonic signals may be generated at other frequencies. These harmonic signals may be generated in the detector 284 as a result of its nonlinear transfer function. To prevent these types of detector-generated harmonic signals from compromising an RF output signal, prior art systems place the detector in each of the RF transmit chains, so that a downstream LPF would filter them out. While the filtering function of an LPF may sufficiently dispose of the harmonic signals, the mismatch of the LPF and a downstream switch may create power control inaccuracies due to the challenge of holding the power flat across various phase angles that may be presented by a corresponding antenna structure. Furthermore, having a detector in each of the RF transmit chains is unnecessarily duplicative as compared to the design of the present embodiment, which utilizes one detector, e.g., detector 284, for a plurality of RF transmit chains, e.g., RF transmit chains 204 and 208.

In the present embodiment, the harmonic suppressor 280 may be used to reduce an amount of harmonic signals, generated by the detector 284, that are transmitted back to the coupler 276. Were such reductions not to occur, the harmonic signals transmitted to the coupler 276 may distort the RF output signal being transmitted to the antenna structure 104 through the output 264. In various embodiments, the reduction of the amount of harmonic signals transmitted from the detector 284 to the coupler 276 may be a full reduction, e.g., no harmonic signals are transmitted back to the coupler 276, or a partial reduction of the transmitted harmonic signals. Thus, the described embodiments provide for the power detection at a desired location, e.g., at the T/R switch 108, without the undesired disruption from harmonic signals.

The detection voltage V_det may be looped back into a power control process, which may be operated by the controller 220, the T/R circuitry 120, and/or the main processor 128, to determine whether the RF output signal is being transmitted with a sufficient/desired power. For example, the power control process may include a comparison of the detection voltage V_det to a reference voltage to determine whether a given condition is satisfied. The satisfaction of this condition may be at least a partial basis for which the controller 220 adjusts the power of the RF output signal. Adjustment of the power of the RF output signal, as discussed above, may be done by controlling the gain of the one or more stages of the power amplifiers 212 or 216 with the amplification control signals 244. In some embodiments, the reference voltage, which may be one of the input control signals 240, may be set based at least in part on external feedback from a device that is communicating with the wireless device 100.

In some embodiments, the T/R switch 108 may have, in addition to the components discussed above related to various transmit functions, components related to various receive functions. For example, the T/R switch 108 may also include a number of receive lines 286, e.g., RX1-RX4, that may be coupled with the antenna structure 104 to receive an OTA transmission.

In some embodiments, the T/R switch 108 may be an integrated circuit having all of its components, including the detection arrangement 272, disposed in a single chip. In other embodiments, portions of the detection arrangement 272 may be implemented off-chip. For example, the detector 284 may be implemented in a separate integrated circuit that is coupled with the integrated circuit having the remaining components of the detection arrangement 272.

Figure 3:
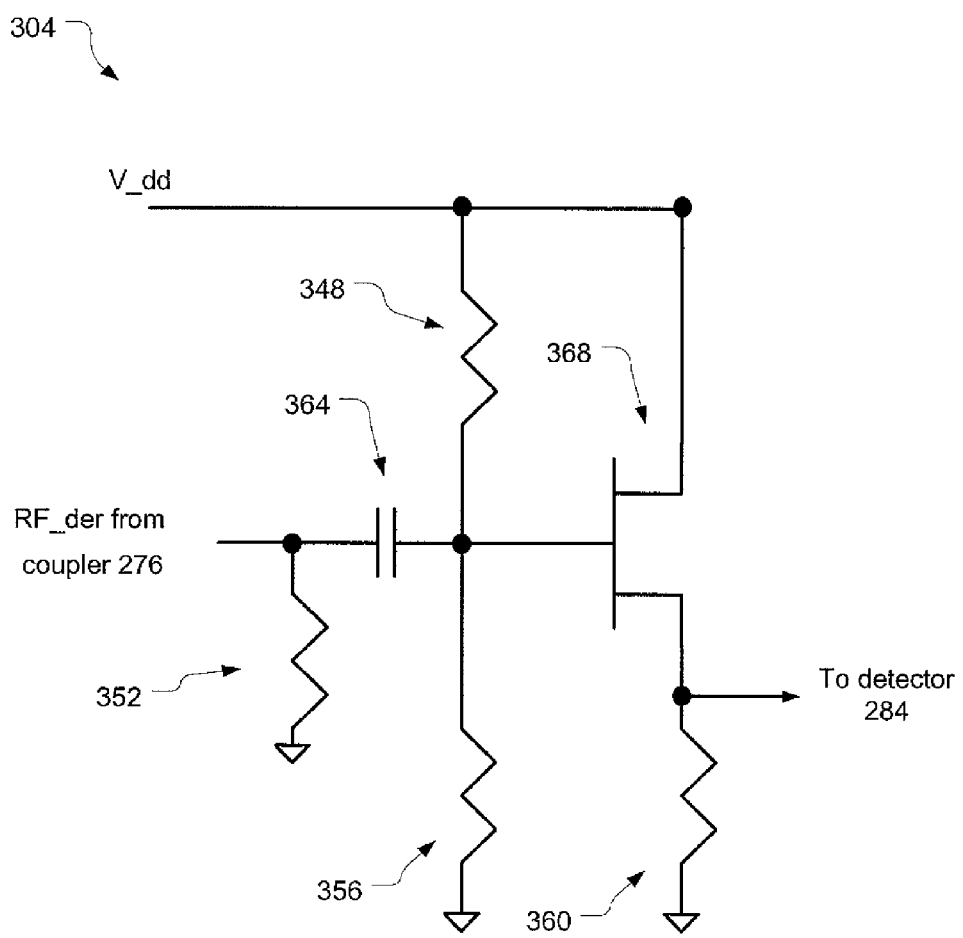
FIG. 3 illustrates a harmonic suppressor that is a source-follower amplifier in accordance with various embodiments.

FIG. 3 illustrates a harmonic suppressor 304 that is a source-follower amplifier in accordance with various embodiments. The harmonic suppressor 304 may be substantially interchangeable with harmonic suppressor 280.

The harmonic suppressor 304 may be coupled with a positive power supply V_dd and may include resistors 348, 352, 356, and 360; a capacitor 364; and a transistor 368 coupled with each other at least as shown. An input of the harmonic suppressor 304 may receive the derivative detection signal, e.g., RF_der, as an input voltage across resistor 352. This input voltage may be provided to a gate of the transistor 368 through the capacitor 364. A drain of the transistor 368 may be coupled with the power supply V_dd, and a source of the transistor 368 may be coupled with the detector 284.

The harmonic suppressor 304 may have a near-unity voltage gain, which may result in an output voltage, seen by detector 284 across resistor 360, being approximately the same as the input voltage across the resistor 352. However, the input voltage across the resistor 352 may not be strongly dependent on the output voltage applied across resistor 360. This may provide an isolation stage that is relatively independent of frequency, resulting in the harmonic suppressor 304 dissipating harmonic signals received from the detector 284, thereby reducing the amount of harmonic signals transmitted back to the coupler 276.

Figure 4:
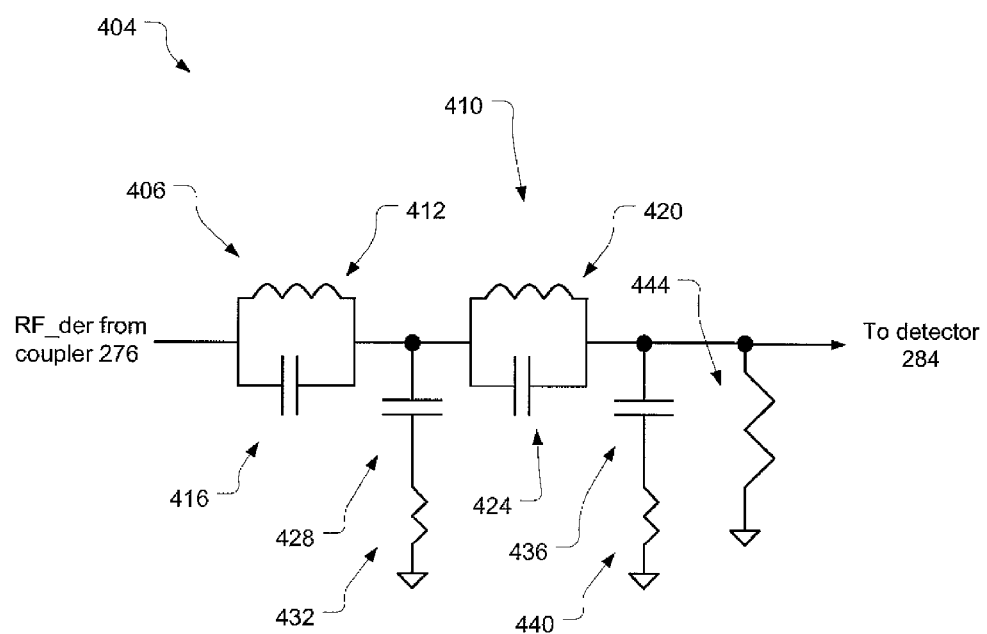
FIG. 4 illustrates a harmonic suppressor that is a filter network in accordance with various embodiments.

FIG. 4 illustrates a harmonic suppressor 404 that is a filter network in accordance with some embodiments. The harmonic suppressor 404 may be substantially interchangeable with harmonic suppressor 280.

The harmonic suppressor 404 may include, on an input line receiving the derivative detection signal RF_der, a first inductance-capacitance (LC) branch 406 coupled in series with a second LC branch 410. The first LC branch 406 may include an inductor 412 coupled in parallel with a capacitor 416. Similarly, the second LC branch 410 may include an inductor 420 coupled in parallel with a capacitor 424.

The harmonic suppressor 404 may also include a first line to ground having a capacitor 428 coupled in series with a resistor 432; a second line to ground having a capacitor 436 coupled in series with a resistor 440; and a third line to ground having a resistor 444. As shown, the first line may be coupled with a node disposed between the LC branch 406 and the LC branch 410, and the second line may be coupled with a node disposed between the LC branch 410 and the detector 284.

The reactive elements of the harmonic suppressor 404, e.g., the elements of the LC branches 406 and 410 and the capacitors 428 and 436, may determine pass and stop band frequencies for the harmonic suppressor 404. The resistors 432 and 440 may provide absorption characteristics at the stop band frequencies, while presenting a controlled harmonic impedance to detector 284. This may provide for an increase in the detected voltage at the detector 284 for a given power of the RF signal being transmitted by the antenna structure 104.

Figure 5:
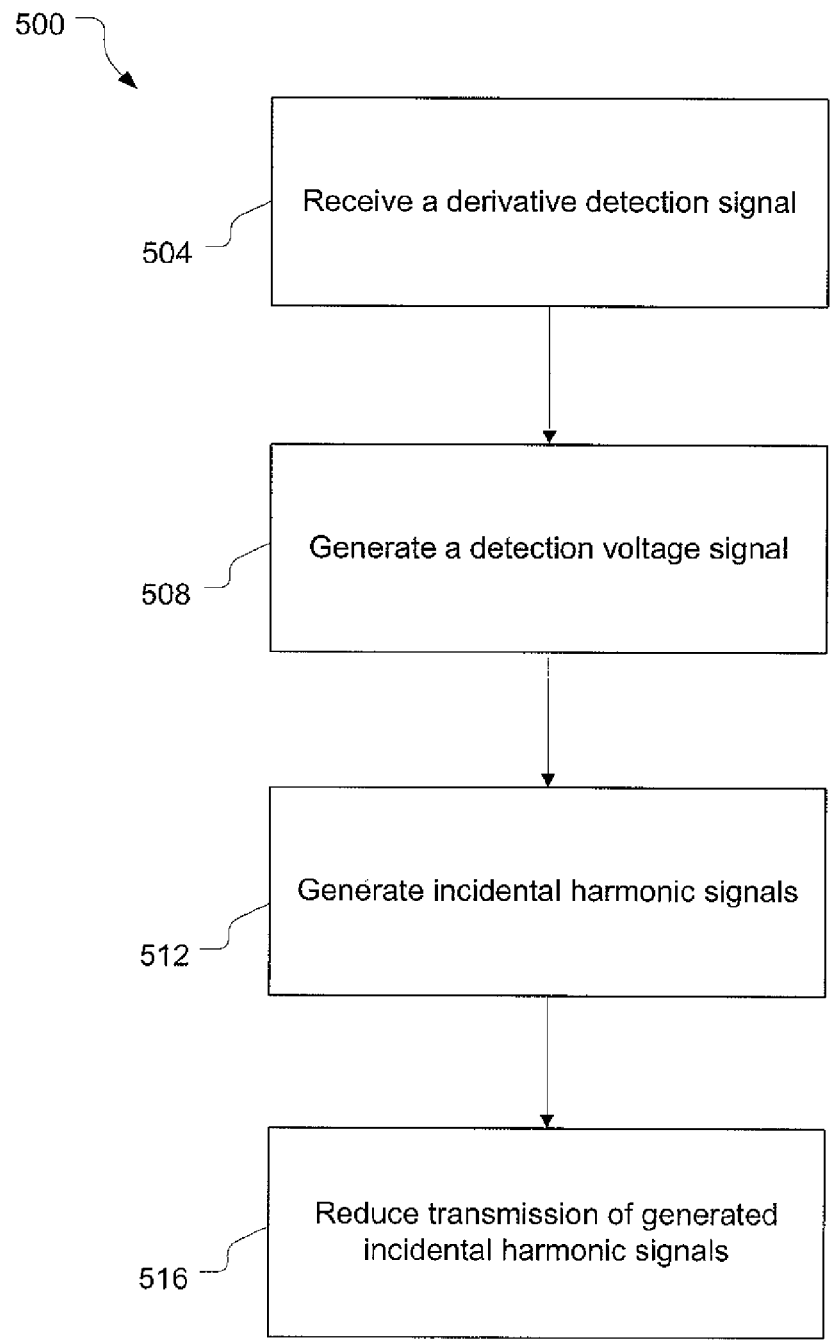
FIG. 5 illustrates a flowchart depicting a power detection operation in accordance with various embodiments.

FIG. 5 illustrates a flowchart 500 depicting a power detection operation in accordance with various embodiments. At block 504, a derivative detection signal may be received. In some embodiments, the derivative detection signal may be received by a detector, e.g., detector 284, from a coupler, e.g., coupler 276.

At block 508, a detection voltage signal may be generated along with incidental harmonic signals at block 512. The generation of the detection voltage signals and incidental harmonic signals may be done by, e.g., the detector 284. Incidental harmonic signals may be harmonic signals that are generated as a result of the generation of the detection voltage.

At block 516, the transmission of generated incidental harmonic signals back to, e.g., the coupler 276, may be reduced. In some embodiments, a harmonic suppressor, e.g., harmonic suppressor 280, may reduce transmission of the generated incidental harmonic signals back to the coupler 276 by dissipating and/or absorbing the incidental harmonic signals.

Although the present disclosure has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present disclosure. Those with skill in the art will readily appreciate that the teachings of the present disclosure may be implemented in a wide variety of embodiments. This description is intended to be regarded as illustrative instead of restrictive.

What is claimed is:

1. A circuit comprising:
   a plurality of inputs configured to be correspondingly coupled with a plurality of radio frequency (RF) chains;
   an output configured to be coupled with an antenna;
   a switch configured to selectively couple a selected one of the plurality of inputs with the output;
   a coupler coupled with, and disposed in between, the switch and the output; and
   a harmonic suppressor coupled with the coupler and configured to reduce an amount of harmonic signals transmitted from a detector to the coupler, the harmonic suppressor including a source-follower amplifier having a transistor including a gate coupled with the coupler, a drain coupled with a power supply, and a source coupled with the detector.

2. The circuit of claim 1, further comprising:
the detector coupled with the harmonic suppressor and configured to detect a power of an RF signal.

3. The circuit of claim 2, wherein the circuit is an integrated circuit.

4. A circuit comprising:
a plurality of inputs configured to be correspondingly coupled with a plurality of radio frequency (RF) chains;
an output configured to be coupled with an antenna;
a switch configured to selectively couple a selected one of the plurality of inputs with the output;
a coupler coupled with, and disposed in between, the switch and the output;
a harmonic suppressor coupled with the coupler and configured to reduce an amount of harmonic signals transmitted from a detector to the coupler, the harmonic suppressor including a filter network having:
a first inductance-capacitance (LC) branch coupled in series with a second LC branch, each of the first LC branch and the second LC branch having a respective inductor coupled in parallel with a respective capacitor;
a first line coupled with a node disposed between the first LC branch and the second LC branch, the first line having a capacitor coupled in series with a resistor; and
a second line coupled with a node disposed between the second LC branch and the detector, the second line having a capacitor coupled in series with a resistor.

5. The circuit of claim 4, wherein the harmonic suppressor is a passive filter.

6. A wireless device comprising:
a plurality of radio frequency (RF) chains;
an antenna;
a switch coupled with the antenna and the plurality of radio frequency chains, the switch configured to selectively couple a first RF chain of the plurality of RF chains with the antenna so that an RF signal amplified by the first RF chain is transmitted by the antenna;
a coupler coupled with, and disposed in between, the switch and the antenna;
a detector coupled with the coupler and configured to detect a power of the RF signal; and
a harmonic suppressor coupled with, and disposed in between, the detector and the coupler and configured to reduce an amount of harmonic signals transmitted from the detector to the coupler, the harmonic suppressor including a source-follower amplifier having a transistor including a gate coupled with the coupler, a drain coupled with a power supply, and a source coupled with the detector.

7. The wireless device of claim 6, wherein the switch, the coupler, the detector, and the harmonic suppressor are disposed in an integrated circuit.

8. A wireless device comprising:
a plurality of radio frequency (RF) chains;
an antenna;
a switch coupled with the antenna and the plurality of radio frequency chains, the switch configured to selectively couple a first RF chain of the plurality of RF chains with the antenna so that an RF signal amplified by the first RF chain is transmitted by the antenna;
a coupler coupled with, and disposed in between, the switch and the antenna;
a detector coupled with the coupler and configured to detect a power of the RF signal;
a harmonic suppressor coupled with, and disposed in between, the detector and the coupler and configured to reduce an amount of harmonic signals transmitted from the detector to the coupler, the harmonic suppressor including a filter network having:
a first inductance-capacitance (LC) branch coupled in series with a second LC branch, each of the first LC branch and the second LC branch having a respective inductor coupled in parallel with a respective capacitor;
a first line coupled with a node disposed in between the first LC branch and the second LC branch, the first line having a capacitor coupled in series with a resistor; and
a second line coupled with a node disposed in between the second LC branch and the detector, the second line having a capacitor coupled in series with a resistor.

9. The wireless device of claim 8, wherein the harmonic suppressor comprises a passive filter.

10. A method comprising:
coupling, with a switch, a selected one of a plurality of inputs with an output so that a radio frequency (RF) signal received from the selected input is transmitted to the output;
generating a derivative signal based at least in part on the RF signal received from the switch;
generating a detection voltage signal based at least in part on the generated derivative signal;
generating harmonic signals incidental to said generating of the detection voltage signal; and
reducing, with a harmonic suppressor, an amount of harmonic signals transmitted to the output, wherein harmonic suppressor includes a source-follower amplifier having a transistor including a gate coupled with the coupler, a drain coupled with a power supply, and a source coupled with the detector.

11. The method of claim 10, wherein said reducing the amount of harmonic signals transmitted to the output comprises:
absorbing or dissipating at least a portion of the generated harmonic signals.

12. A method comprising:
coupling, with a switch, a selected one of a plurality of inputs with an output so that a radio frequency (RF) signal received from the selected input is transmitted to the output;
generating a derivative signal based at least in part on the RF signal received from the switch;
generating a detection voltage signal based at least in part on the generated derivative signal;
generating harmonic signals incidental to said generating of the detection voltage signal; and
reducing, with a harmonic suppressor, an amount of harmonic signals transmitted to the output, wherein the harmonic suppressor includes a filter network having:
a first inductance-capacitance (LC) branch coupled in series with a second LC branch, each of the first LC branch and the second LC branch having a respective inductor coupled in parallel with a respective capacitor;
a first line coupled with a node disposed between the first LC branch and the second LC branch, the first line having a capacitor coupled in series with a resistor; and
a second line coupled with a node disposed between the second LC branch and the detector, the second line having a capacitor coupled in series with a resistor.

* * * * *